Sept. 2, 1958

W. C. ANDERSON 2,849,881

PNEUMATIC APPARATUS FOR MEASURING
LIQUID QUANTITY IN A CLOSED TANK

Filed July 22, 1955

INVENTOR.
WILMER C. ANDERSON

BY
R. J. Dearborn,
ATTORNEY

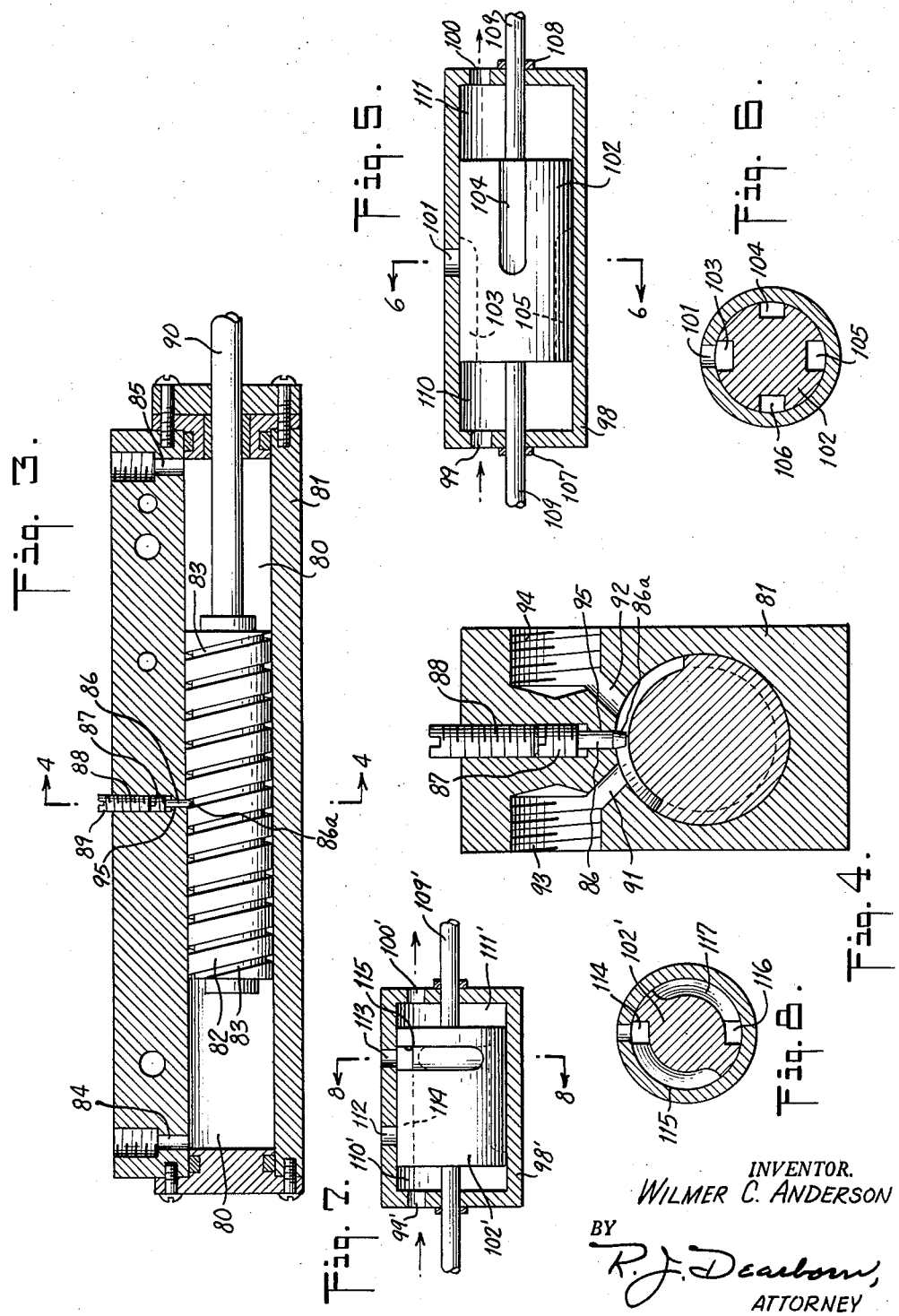

United States Patent Office 2,849,881
Patented Sept. 2, 1958

2,849,881
PNEUMATIC APPARATUS FOR MEASURING LIQUID QUANTITY IN A CLOSED TANK

Wilmer C. Anderson, Greenwich, Conn., assignor to The Liquidometer Corporation, Long Island City, N. Y., a corporation of Delaware Application July 22, 1955, Serial No. 523,771

5 Claims. (Cl. 73—290)

This invention is concerned with an apparatus for measuring a quantity of liquid in a closed tank. More specifically, the invention employs a system that makes use of a pneumatic equivalent of an electric bridge circuit, in order to compare and thus measure the volume of the space above the liquid in the tank as compared with a given predetermined volume.

In certain applications, i. e., most particularly in aircraft, the tanks for holding fuel are irregular in shape and furthermore, may be situated in an infinite variety of attitudes. For these reasons, the measurement of the quantity of liquid in such a tank creates real problems. By employing a system according to this invention, the volume of fuel contained in a tank may be accurately measured at all times and in nearly any attitude, as a fraction of the known volume of the empty tank. This is accomplished by employing an alternating pressure-pulse pneumatic system to measure the volume of air space located above the fuel in the tank.

Thus it is an object of this invention to provide an apparatus for measuring a quantity of liquid in a closed tank, embodying a pneumatic system. Consequently the irregularity of the shape or wall configuration of the tank, coupled with changes in position or attitude of the tank will not affect the measurement of the quantity of fuel contained therein.

Another object of the invention is to provide a pneumatic system for directly measuring the space within a closed tank that is not occupied by the liquid contained therein.

Briefly, the invention includes means for measuring the quantity of liquid in a closed tank which has a predetermined volume when empty. Such means comprise means for applying pneumatic pressure variations to said tank above the surface of the liquid therein, and for applying pneumatic pressure variations to a closed space having a predetermined volume; also, means for comparing the predetermined volume with the volume above the liquid in said tank in order to determine the volume of liquid in the tank.

In particular, the invention is concerned with a liquid-quantity measuring system for a substantially closed tank. The system comprises a pneumatic circuit and includes said tank and a reference closed space. The system also comprises means for applying pneumatic pressure variations to said circuit, and means connected to said circuit for comparing the volume of said closed space with the volume of the space above said liquid in order to measure the volume of the liquid contained therein.

While many variations of the invention may be had, which will suggest themselves to anyone skilled in the art, a given embodiment thereof is described below and illustrated in the drawings, in which:

Fig. 3 is a longitudinal cross-section view of a variable pneumatic resistance in the form of a variable length capillary;

Fig. 4 is a cross-section view taken along the line 4—4 of Fig. 3;

Fig. 5 is a longitudinal cross-section illustrating a pneumatic chopper for use in the system of this invention;

Fig. 6 is a transverse cross-section taken along the line 6—6 of Fig. 5;

Fig. 7 is a longitudinal cross-section illustrating a modified form of chopper or pneumatic pressure pulse generator; and Fig. 8 is a transverse cross-section taken along the line 8—8 of Fig. 7.

In order to measure the volume of liquid in a tank, where the liquid is subject to frequent changes in location within the tank, the quantity of fuel or liquid may be directly measured by measuring the volume of air space located above the liquid. Such measurement of the volume of space above the liquid has the great advantage of being direct and accurate, independent of the attitude or of forces which may be acting upon the tank at the time that the volume is being measured.

Figure 1:
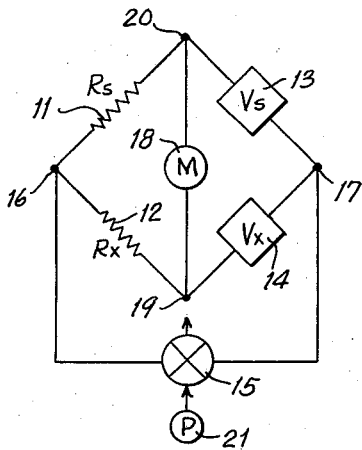
Fig. 1 is a schematic electrical diagram showing an equivalent electrical circuit for purposes of explanation.

The basic theory of the operation of the system may be explained most simply by reference to its electrical equivalent which is illustrated in Fig. 1. There is shown and electrical bridge circuit including two resistance arms 11 and 12, which are marked $R_s$ and $R_x$, respectively. Connected as the other two arms of the bridge circuit, with these resistors 11 and 12, there is a pair of capacitors 13 and 14, which are illustrated as boxes marked $V_s$ and $V_x$, respectively. The bridge, which is made up of the pair of resistors 11 and 12 and the pair of capacitors 13 and 14, is connected to a source of input energization 15 at the points 16 and 17. Connected to the other two diagonal points 19 and 20 of the bridge circuit there is shown a meter 18 which measures the difference in potential between diagonal points 19 and 20. Now, for such an electrical bridge circuit, a source of energization 15 would be any A. C. electrical potential source. Then, so long as the bridge is in balance, the meter 18 will indicate zero, which means that the potential difference between points 19 and 20 is zero. Under these conditions (as is well known in electrical bridge circuits), the ratio of the resistance values for resistors 11 and 12, equals the ratio of the capacitance values for capacitors 14 and 13 respectively. Therefore, where the values of capacitance 13, resistance 11, as well as the resistance 12 are known, the value of the unknown, or variable capacitor 14, may be calculated.

In the system according to this invention a pneumatic circuit is set up such that capacitor 13 will be replaced by a closed space ($V_s$) and capacitor 14 will be replaced by an unknown volume of air space above the liquid in a tank ($V_x$). Then, by employing pneumatic resistances to replace electrical resistors 11 and 12, the pneumatic system may be balanced so that a differential pressure responsive device (M) reads zero. At balance thus indicated, the volume of air space above the fuel in the tank corresponding to the capacitor 14 ($V_x$) will have the same relationship to the volume of air space within the known closed space corresponding to the capacitor 13 ($V_s$), as the value of the pneumatic resistance corresponding to the electrical resistor 11 ($R_s$), has to the value of the other pneumatic resistance corresponding to the electrical resistor 13 ($R_x$). Thus the unknown volume of air space within the tank $V_x$ may be calculated in the same manner as the capacitance value of a capacitor 14 would be, in an electrical bridge circuit.

In a pneumatic system, the source of potential 15 may take the form of a valve, or other arrangement, for producing alternating pressure pulses from a source of pneumatic pressure 21. Such pneumatic pulses may be created by a chopper which will be described in greater detail below, and which connects the pneumatic pressure source 21 for short-duration pulses alternately to the diagonal points 16 and 17 while the opposite one of these two points is connected to the atmosphere, or to the return side of the pneumatic pressure source 21. Actually the point 17 and connected circuit lines need not exist in the pneumatic system, because they are unnecessary as will appear below in connection with Fig. 2. However, the electrical analogy is better with these lines included. It is contemplated that the pneumatic pressure pulses will be employed with a frequency that is relatively low, speaking in an electrical sense, i. e. a pulse frequency that is only a few cycles per second.

Figure 2:
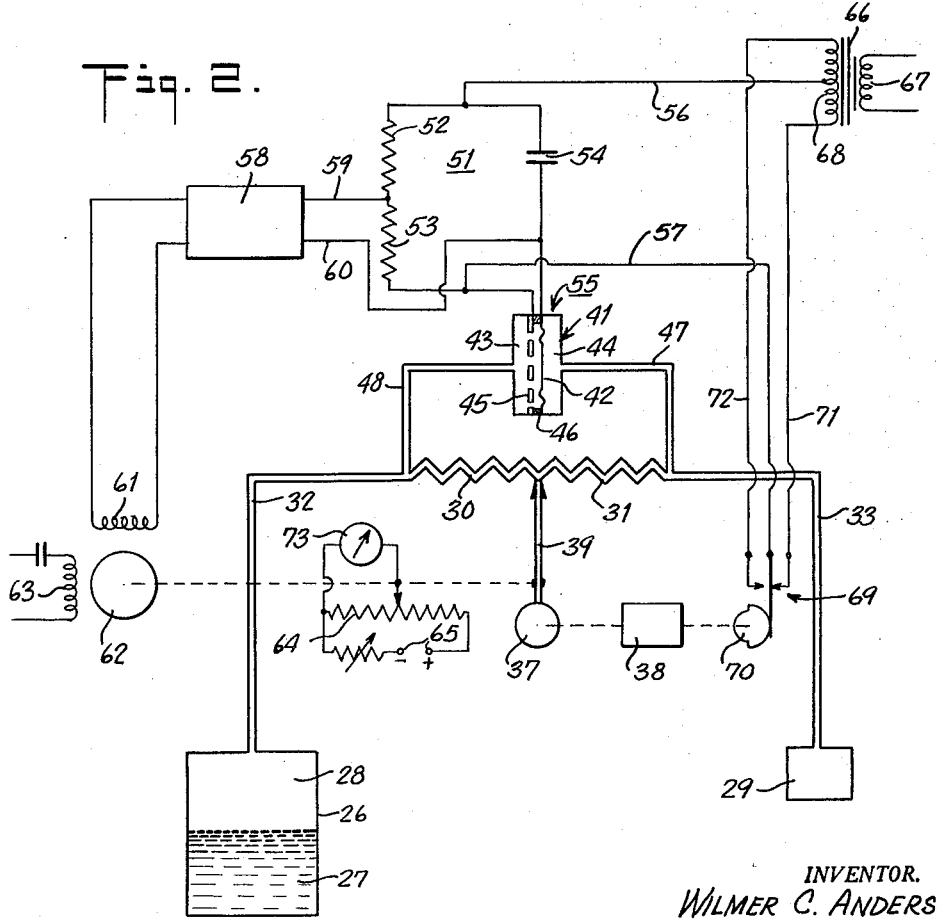
Fig. 2 is a circuit diagram including pneumatic and electric circuits for carrying out an embodiment of the invention.

Referring to Fig. 2, it will be observed that there is shown a closed tank 26 containing a variable quantity of liquid 27 therein, and having a correspondingly variable space 28 above the liquid 27. This tank 26 may represent a fuel tank that is having its contents measured as to quantity of liquid therein. There is a closed space 29, which may be any convenient container having a known volume. Connected between these two closed volumes 28 and 29, there is a pair of pneumatic resistance elements 30 and 31. Completing this connection, there are two tubes or pipes 32 and 33 connected from the space 28 to one extremity of the pneumatic resistor 30 and from one end of pneumatic resistor 31 to the fixed known volume space 29, respectively. The pneumatic resistance elements 30 and 31 may take various forms, e. g. adjustable needle valves or the like. However, it is preferred to employ variable length capillary passages, which are described in more detail below.

The source of energization of the pneumatic bridge may take various forms, as indicated above. For example, one could be a reciprocating piston and cylinder arrangement (not shown) with opposite ends of the open cylinder connected to the two sides of the pneumatic bridge. Another could be a blower with the intake and exhaust ports alternately switched to two sides of the bridge by a rotating or reciprocal type valve. A third could be a source of constant high pressure, such as a pump and tank (not shown), which is alternately connected to the sides of the bridge. Between pressure connections the bridge arms would be connected so as to exhaust to the atmosphere. In Fig. 2, the embodiment contemplated is an arrangement for chopping a source of pressure (not shown) into pulses having a predetermined frequency. Such a chopper is schematically illustrated in Fig. 2 where a rotary chopper element 37 is connected for rotation by a motor 38.

The element 37 acts to produce short-duration pneumatic pressure pulses which flow through a tube 39 to be introduced at an adjustable location along the length of a capillary tube or passage which is made up of the pneumatic resistance elements 30 and 31. Between the application of these pneumatic pressure pulses, the passage of tube 39 is connected directly to the atmosphere in order to vent each preceding pressure pulse. The physical arrangement of the pneumatic passages at the point on the adjustable location along a capillary passage comprising pneumatic resistance elements 30 and 31 is such that the pressure pulses are divided by a partition to travel over the pneumatic paths, including capillaries or resistance elements 30 and 31, simultaneously.

In order to detect conditions of balance and unbalance of the pneumatic bridge, there is a differential pressure-sensitive device 41 which includes a diaphragm 42 that divides the internal space of the element 41 into separate chambers 43 and 44. Diaphragm 42 is made of an electrically-conductive material to render it useful as one electrode of a capacitor. There is also a perforated electrically conducting material member 45 located parallel and adjacent to the diaphragm 42, but separated therefrom by an electrically insulating material spacer, e. g. a ring 46. The diaphragm 42 and member 45 form an electrical capacitor that is variable in capacitance in accordance with the spacing between member 45 and the diaphragm 42, so that when different pressures are applied to the chambers 43 and 44 of the device 41, diaphragm 42 will be displaced and so change the electrical capacitance of the capacitor thus formed.

It will be noted that there is a tube or pipe 47 connecting the chamber 44 with the tube 33 and the extremity of the variable capillary or pneumatic resistance element 31. Likewise, there is a tube 48 which connects the chamber 43 to the tube 32 and the extremity of the capillary or pneumatic resistance element 30.

Now it will be observed that the elements so far described constitute a pneumatic bridge circuit which may be employed to carry out the method according to this invention. It will be noted that the method includes the application of pneumatic pressure variations to both the unknown volume space 28 and the known volume space 29, via the common tube 39 and the respective capillaries or pneumatic resistance elements 30 and 31. The volumes of these spaces are then compared by means of the bridge circuit including the capillaries 30 and 31 which are relatively varied to balance the bridge. The condition of balance of the bridge is measured by the differential device 41. The diaphragm 42 will remain in a predetermined neutral state under equal pressures in chambers 43 and 44; while it will be displaced left or right, as viewed in Fig. 2, whenever the pressures in chambers 43 and 44 are unequal. Consequently, by varying the location of the connection for pneumatic passage 39 to the capillaries or pneumatic resistance elements 30 and 31 until the pressures in chambers 43 and 44 remain equal at all times, a balanced condition may be had. At this time the ratio of the length of capillary 31 to the length of capillary 30 will equal the ratio of the volume of space 28 to the volume of space 29. Therefore, the position of the adjustable connecting point along capillaries 30 and 31 may be calibrated to indicate this ratio, which calibration may be made in terms of the volume of the liquid 27, which is the difference between the total volume of tank 26 and the volume of space 28.

There is also shown in Fig. 2 a servo system connected to the pneumatic bridge circuit. This acts continuously to maintain the pneumatic bridge in balance, and at the same time to provide an indication of the ratios involved which may be calibrated as desired to indicate the quantity of the liquid 27 in the tank 26. Such a servo system might take various forms. That illustrated includes an electric bridge 51 having arms including resistors 52 and 53 and an arm including a capacitance 54 adjacent to resistor 52. An electrical capacitor 55 is connected in the bridge 51 adjacent to resistor 53. The capacitor 55 is made up of the elements 42 and 45 of differential pneumatic pressure device 41. The bridge 51 is energized via a pair of wires 56 and 57, while the output of bridge is connected to an amplifier 58 via wires 59 and 60. Amplifier 58 supplies a control winding 61 of an A. C. motor 62 which has an energizing winding 63 thereon. Motor 62 may be any feasible type of motor such as a two-phase A. C. motor which reverses in direction with a reversal of phase of the energization of its control winding, i. e. winding 61. Mechanically connected to the motor 62 there is a remote indicator 73 which is connected to a potentiometer 64 that is in turn connected across an appropriate source of electric current (not shown) which will be applied at a pair of terminals 65. In addition, it will be noted that the motor 62 is connected mechanically to pneumatic tube or passage 39 for adjustably varying the position along capillaries or pneumatic resistance elements 30 and 31 where pneumatic pressure pulses are introduced into the pneumatic bridge system.

Electrical bridge 51 is energized in any convenient manner, as by means of a transformer 66 having a primary winding 67 and a center-tapped secondary winding 68. Wire 56, which feeds one input to the bridge 51, is connected to the center-tapped point of the secondary winding 68; while the other input wire 57 for the bridge 51 leads to a cam-actuated switch 69. Switch 69 is controlled by a cam 70 that is driven directly by the motor 38 in correspondence with the pneumatic pulse-producing element 37. Wire 57 is therefore alternately connected to a wire 71 and a wire 72, which lead to opposite ends of the secondary winding 68. The purpose of switch 69 and the connected circuits is to reverse the phase of the input energization for the bridge 51 in correspondence with the pressure pulses applied to the pneumatic bridge circuit in order to maintain the proper electrical phase relationship, as will be more fully described below.

In Fig. 3, there is shown a variable length capillary device which may be employed as the variable pneumatic resistors 30 and 31 of the pneumatic circuit arrangement shown diagrammatically in Fig. 2. This device provides a cylindrical chamber 80 longitudinally located within a housing 81 which may have a rectangular shape in cross-section, as shown in Fig. 4. The chamber 80 contains a piston 82 which has a spiral groove, or capillary passage 83 on the surface thereof. The piston 82 thus divides chamber 80 into two sections that are connected for pneumatic communication by the spiral groove 83. There is a pair of passages 84 and 85, one at either end of the chamber 80, which may have threaded external construction as illustrated, in order to connect the necessary pneumatic tubes such as tubes 32 and 33 of Fig. 2. The ends of chamber 80 will be closed and sealed as illustrated so that the passages 84 and 85 lead only to the respective ends of the spiral groove 83.

Spiral groove 83 is divided into two variable length portions by means of a pin 86 that is constructed with a tip 86a having a shape to conform with the cross-sectional configuration of spiral groove 83 in order to create an effective pneumatic partition for the groove 83 which divides it into the two portions indicated. Pin 86 may conveniently be constructed as illustrated with a larger diameter threaded head portion 87 that is positioned within a threaded hole 88. Pin 86 will of course extend through a smaller diameter hole 95 in the housing 81 at the bottom of threaded hole 88, so as to allow the tip 86a of the pin 86 to extend into and fill the cross-sectional area of spiral groove 83. There is a set screw 89 which also threadably engages the hole 88 in order to fix and maintain a given adjusted position for the pin 86 by reason of contacting the head portion 87 thereof.

The piston 82 has a shaft or piston rod 90 attached to and extending from one end thereof in order to allow adjustment of the horizontal position of piston 82 (as viewed in Fig. 3) within the chamber 80, by means of rotation of the shaft 90 so as to cause longitudinal movement thereof by reaction between pin 86 and the spiral groove 83. It will be observed that the shaft 90 will be mechanically connected to a servomotor, e. g. motor 62 shown in Fig. 2, which will be energized whenever the pneumatic bridge is unbalanced and will thus rotate the shaft 90 and the piston 82 to vary the relative lengths of the portions of the spiral groove 83 that are located on either side of the pin 86 and thus rebalance the pneumatic bridge circuit.

At the center of the housing 81, on either side of and adjacent to the pin 86, there is a pair of passages 91 and 92 (Fig. 4) which provide pneumatic connection to the spiral capillary groove 83 on either side of the partition created by the pin 86. The passages 91 and 92 are connected to a pair of threaded holes 93 and 94 respectively for effecting the mechanical connection of a pneumatic tube such as the tube 39 of Fig. 2. It will be noted that in the circuit illustrated and explained in connection with Fig. 2, both passages 91 and 92 are joined in common to a single pneumatic tube 39 so as simultaneously to receive pressure pulses therethrough.

Figs. 5 and 6 illustrate a pneumatic chopper which may be employed to provide pressure pulses for actuating the pneumatic bridge circuit illustrated in Fig. 2. There is a cylindrical housing 98 having three passages 99, 100 and 101 therein. Passages 99 and 100 are located respectively in the end walls of the housing 98, while the passage 101 is located on the longitudinally dividing center line of housing 98 and leads through the side wall of the housing. Contained within the central cylindrical chamber formed by housing 98 there is a piston 102 having four grooves 103, 104, 105 and 106 cut in the surface thereof and extending in pairs from opposite edges of the piston 102 to somewhat past the location of the hole 101. Piston 102 is centrally located within housing 98 and is maintained in this position against longitudinal shifting by means of a pair of washers or rings 107 and 108 which are suitably secured to a shaft 109 by which the piston 102 is carried. Passages 99 and 100 are located in the ends of housing 98 for connection respectively to a source of pneumatic pressure and to the atmosphere or the return side of the pneumatic pressure source. The chopper structure is symmetrical so that which of these two passages 99 or 100 is connected to the pressure side of the source is immaterial. As indicated, passage 101 is centrally located in the housing 98, and the piston 102 is fitted within housing 98 so as substantially to block flow of pneumatic fluid therebetween.

The operation of the pneumatic pressure pulse generator or chopper as thus described will be clear upon inspection. It includes the fact that the frequency of pressure pulse generation depends upon the speed of revolution of piston 102, by means of its shaft 109 which extends out near the ends of the housing 98. Assuming that the pneumatic pressure source is connected to the passage 99, fluid pressure will be introduced as indicated by the arrow into a chamber 110 at the left end of piston 102, as viewed in Fig. 5. This pressure will then (in the position of the parts shown) be transmitted directly via the groove 103, which extends from the face of piston 102 to the passage 101. Following this, when the piston 102 has rotated 90°, so that passage 101 is connected to the groove 104 in piston 102, the passage 101 is then connected to the atmosphere or the return side of the pneumatic pressure source, by means of groove 104, a chamber 111 at the other end of housing 98, and passage 100 in housing 98. Then the next cycle will be commenced when piston 102 has rotated 90° more and passage 101 is again connected to passage 99 via the groove 105 and chamber 110. The other half cycle of this pneumatic pressure pulse alternation is created by the further 90° rotation of piston 102 such that groove 106 connects the passage 101 to chamber 111 and the outlet or exhaust passage 100.

*Operation*

The method of operation of the apparatus of the present invention may best be described in connection with the operation of the particular embodiment illustrated and explained above. Pneumatic pressure variations are applied from any given source (not shown) e. g. a blower or pneumatic pressure tank or the like, to a tank that is substantially closed and contains a liquid therein, the volume of which is to be measured. Such tank is illustrated in Fig. 2 as tank 26, and such variations may be created by a pneumatic chopper, e. g. chopper 37 shown in Fig. 2. At the same time, the pneumatic pressure variations are applied to a closed space that has a predetermined known volume, e. g., the closed space 29 illustrated in Fig. 2. Then the volumes of these two closed spaces, i. e., the space 28 above the liquid in tank 26 and the space 29 in known volume container, are compared with one another in order to determine the volume of the space above the liquid in tank 26. The carrying out of these basic steps will be more fully set forth in connection with a detailed explanation of the manner in which the particular embodiment that has been illustrated and described operates.

Referring to Fig. 2, it is pointed out that pneumatic pressure pulses are cyclically produced by the chopper 37, e. g., chopper structure illustrated in Figs. 5 and 6. These pulses are carried through a pneumatic passage 39 to a variably located point along a pneumatic restriction means, or capillary passage, composed of two parts 30 and 31. It is to be noted that these pressure pulses as thus introduced are simultaneously connected to both capillary passages 30 and 31 and travel thereover in opposite directions. The two pressure pulses thus created by the dividing action between the capillary passages 30 and 31 travel to the connected closed spaces 28 and 29 respectively. The action of these pulses, in traveling through the capillary restrictions or pneumatic resistance elements and then into the closed spaces connected thereto, creates an action that is similar to the equivalent electrical circuit action wherein electrical resistors are connected in a bridge circuit with capacitors. Thus, depending upon the relative volumes of spaces 28 and 29, the time lag of the pressure pulses traveling through the pneumatic resistance elements 30 and 31 will be determined by the particular volumes and lengths of the restrictions involved. Consequently, by connecting a differential pressure-responsive element, e. g., element 41, at the extremities of the pneumatic resistance elements 30 and 31, a balanced condition may be detected when the time lags are equal. This will be the balanced condition for the pneumatic bridge circuit.

It will be noted that the servo arrangement is such that whenever the diaphragm 42 of differential pressure device 41 is not in its neutral or balanced position, a signal will be had, causing the servomotor 62 to run and reposition the point of connection of the pneumatic tube 39 relative to the variable length pneumatic resistance elements 30 and 31, until balance is established. In the illustrated electrical circuit for servomotor 62, the motor will run in one direction or the other, depending upon the phase of its control signal as determined by the output of electrical bridge 51. Therefore, when diaphragm 42 is extended in one direction, the capacity of capacitor 55 will be decreased and the bridge 51 unbalanced, to provide a signal having a given phase relative to the energizing winding 63. When diaphragm 42 is extended in the other direction, capacitor 55 will be increased in capacity and the bridge 51 unbalanced in the other direction, providing an opposite phase signal to energize winding 61 so that the motor 62 will run in the opposite direction.

In order to maintain the operation as described above, in spite of the difference in frequency between the pneumatic and the electric circuits; or, in other words, since the pressure sensitive device 41 (capacitor 55) cannot distinguish between phase change at the output of electric bridge 51, caused by passing through the pneumatic bridge null position, and that produced by the cyclic change of the alternating pneumatic pressure source, some means must be employed to make such distinction in order to make the servo system operate properly. Thus, there is an arrangement for reversing the phase of the energization of electrical bridge 51 with each half cycle of the alternating pneumatic pulse cycle generated by the chopper 37. Cam 70 will switch the movable blade of switch 69 and connect the wire 57 alternatively to one end or the other of the secondary winding 68 of transformer 66, via wires 71 or 72. In this way the phase of the energization of the bridge 51 is switched in time with the pneumatic pulse cycles, and consequently a reversal of phase of the output from bridge 51 occurs only with a reversal of phase of the pneumatic pulse cycles as detected by pressure-sensitive device 41. This occurs only when the pneumatic bridge circuit passes through its null position.

In order to take advantage of using a relatively small fixed air space to be compared with the fuel tank being measured without sacrificing accuracy, it is contemplated that a ratio-type chopper may be employed. By making use of such a chopper, simultaneous pressure pulses having a given volume ratio to one another, may be introduced to the two arms of the pneumatic bridge circuit. In this manner the effective ratio of the pneumatic restriction passages or resistance elements will be changed, so that the balance point for the system may be maintained nearer the center of the variable restriction passages. In other words, the working range for the system is set at a more accurate portion of the full adjustable range thereof. By way of illustration, the ratios of $$\frac{V_x}{V_s} \text{ and } \frac{R_s}{R_x}$$

(see Fig. 1) will be as follows for an ordinary 1:1 chopper arrangement:

$$\frac{V_x}{V_s} \longrightarrow 1:1, \quad 10:1, \quad 100:1$$

$$\frac{R_s}{R_x} \longrightarrow 1:1, \quad 10:1, \quad 100:1$$

Whereas, by using a ratio chopper, e. g. one having a 10:1 ratio for the two halves of the pneumatic bridge, the ratios will be as follows:

$$\frac{V_x}{V_s} \longrightarrow 1:1, \quad 10:1, \quad 100:1$$

$$\frac{R_s}{R_x} \longrightarrow 1:10 \quad 1:1, \quad 10:1$$

A ratio chopper for providing the beneficial range operation as indicated above is illustrated in Figs. 7 and 8. This chopper may replace the chopper according to Figs. 5 and 6, in the system described above in the manner to be indicated. Corresponding elements of the ratio chopper are given numbers corresponding to their counterparts of the chopper shown in Figs. 5 and 6, but with a prime mark. Different elements have new numbers. Consequently, it will be noted that the changes in structure include the change from a single passage 101 (Fig. 5) to a pair of passages 112 and 113, that are both located in the sidewall of the housing 98', and are controlled by the piston 102' in a manner corresponding to the control of passage 101 by the piston 102 in Fig. 5. In addition, it will be noted that instead of four grooves as before, there are only two compound grooves 114—115 and 116—117 situated opposite one another on the surface of the piston 102'. The compound groove 114—115, which opens into the chamber 110', has a longitudinal or axial portion 114 that allows the pneumatic pressure to exist within this groove 114 at all times as well as within the circumferential groove 115 extending at right angles to the axial groove 114. Circumferential groove 115 is connected to axial groove 114 and is located directly in registry with the passage 113. In a similar manner, the other groove 116 is always open to, and connected with, the chamber 111'. It is made up of an axial portion 116 with a connecting circumferential groove 117 that also is arranged to register with the passage 113 (for connection therewith when the groove 117 or that portion of the groove 116 is located opposite the passage 113).

It is pointed out that as the shaft 109' is rotated, pressure pulses (from the pressure source connected to passage 99') will be created, or allowed to pass, via the passages 112 and 113. However, the duration of the two pressure pulses thus created will vary depending upon the ratio of the width of groove 114 to the length of the circumferential groove 115. The return connection for these ratio-sized pulses will be correspondingly made, i. e., as the groove 116 is connected to passage 112, and the circumferential groove 117 will be connected to the passage 113 to return the larger volume, longer-duration pulse which was introduced by the compound groove 114—115.

It will be noted that when using a ratio chopper in accordance with Figs. 7 and 8, passages 112 and 113 will be separately connected to passages 91 and 92 of the variable capillary element illustrated in Figs. 3 and 4.

While certain embodiments according to this invention have been described in considerable detail in accordance with the applicable statutes, this is not to be taken as in any way limiting the invention but merely as being descriptive thereof.

It is claimed:

1. A liquid quantity measuring system for a substantially closed tank comprising means enclosing a reference space, capillary means including at least one variable length portion, means for applying pneumatic pressure variations through said capillary means to said tank and to said space, differential pressure sensitive means connected to the tank and to said space, means controlled by said last-named means for adjusting said variable length capillary in order to balance said pressure variations, and indicator means driven by said adjusting means for indicating the quantity of liquid in said tank.

2. A liquid quantity measuring system for a substantially closed tank comprising means enclosing a reference space, capillary means including at least one variable length portion, means for producing alternating pneumatic pulses having a predetermined frequency, means for applying said pulses through said capillary means to said tank and to said space, differential pressure-sensitive means connected to the tank and to said space, means controlled by said last-named means for adjusting said variable length capillary in order to balance said pressure pulse variations, and indicator means driven by said adjusting means for indicating the quantity of liquid in said tank.

3. A liquid quantity measuring system for a substantially closed tank comprising means enclosing a reference space, capillary means including a restrictive passage having a variable length, means for connecting said capillary means to said tank and to said space, means for producing alternating pneumatic pulses having a predetermined frequency, means for applying said pulses through said capillary means to said tank and to said space, differential pressure-sensitive means including a variable capacitor and connected to the tank and to said space, servo means controlled by said variable capacitor for adjusting said variable length passage to balance said pneumatic pulses as received at said differential means, and indicator means driven by said servo means for indicating the quantity of liquid in said tank.

4. A liquid quantity measuring system for a substantially closed tank comprising means enclosing a reference space having a predetermined volume, means for applying pneumatic pressure variations periodically from a single source both to said tank and to said space including variable length restriction means, means for differentially comparing the pressure variations in said tank and in said space, and means controlled by said comparing means for varying the length of said restriction means, so as to reduce the pressure variations to which said comparing means is subject to a minimum, and also for indicating the ratio of the volume of said reference space to that of the space above the liquid in said tank.

5. A liquid quantity measuring system for a substantially closed tank, comprising means enclosing a reference space having a predetermined volume; means for applying relatively short duration pneumatic pulses from a single source both to said tank and to said space and for venting same, including variable length restriction means; differential pressure responsive means connected to said tank and to said space and producing a signal of one phase or the opposite phase, depending on whether the pressure is higher in said tank or in said space; means for reversing the phase of said signal during the venting of said pneumatic pulses, in order to maintain the phase of the signal constant for a given system unbalance; and means controlled by said signal for varying said restriction means to balance said system and thereby to reduce said signal to a minimum, in order to determine the ratio of said reference space to the space in said tank.

References Cited in the file of this patent

UNITED STATES PATENTS

| | | |
|---|---|---|
| 1,630,781 | Burman | May 31, 1927 |
| 1,885,926 | Lewis | Nov. 1, 1932 |
| 2,116,636 | Neuman | May 10, 1938 |
| 2,691,304 | Smith | Oct. 12, 1954 |

FOREIGN PATENTS

| | | |
|---|---|---|
| 695,876 | Germany | Sept. 5, 1940 |